United States Patent Office 3,534,109
Patented Oct. 13, 1970

3,534,109
PROCESSES FOR THE PRODUCTION OF 1,4-HYDROXY - 1,2,3,4 - TETRAHYDRONAPHTHALENE AND DERIVATIVES THEREOF
Harold D. Rider, Denver, Colo., assignor to Marathon Oil Company, Findlay, Ohio, a corporation of Ohio
No Drawing. Filed Feb. 26, 1965, Ser. No. 435,700
Int. Cl. C07c 39/00, 35/36
U.S. Cl. 260—618                                            5 Claims

ABSTRACT OF THE DISCLOSURE

The present invention comprises a method of recovering compounds having the structure:

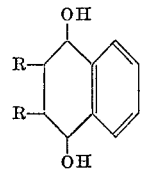

where R is selected from the group consisting of hydrogen and alkyl hydrocarbon groups having less than 6 carbon atoms, from product mixtures containing said compounds together with an alcohol having from 1 to 6 carbon atoms, compounds having the structure:

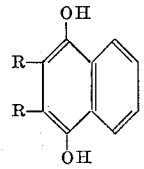

and compounds having the structure:

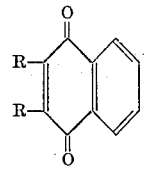

where R is defined as above in all cases, said method comprising in combination the steps of evaporating said alcohol until less than 0.1 to 4 parts by weight alcohol remain for each part by weight of the above aromatic compounds, thereafter adding at least 30% by weight based on the weight of the above aromatic compounds of an ether boiling below 200° C. at atmospheric pressure and recovering the precipitate thus formed.

---

The present invention relates to the purification of certain organic compounds and in particular relates to the separation of tetralin diol and its alkyl hydrocarbon derivatives from the other ingredients present in product mixtures resulting from the hydrogenation of 1,4-naphthoquinone and corresponding alkyl hydrocarbon substituted compounds.

Copending application Ser. No. 330,000 now U.S. Pat. No. 3,375,285 filed Dec. 12, 1963, by P. A. Argabright and assigned to the same assignee in the present application, discloses a new selective route for the hydrogenation of naphthoquinones to catalytically reduce them to the corresponding diols by the use of a copper chromite catalyst. The preferred reaction media for this reduction process is ethanol or other $C_1$ to $C_6$ alcohol. The reaction mixtures resulting from the catalytic hydrogenation, therefore, comprise the product 1,4-hydroxy1,2,3,4-tetrahydronaphthalene (Tetralin Diol, a trademark) or alkyl substituted derivatives having a structure as follows:

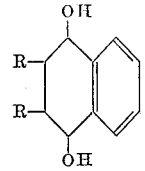

(throughout this application R indicates a radical selected from the group consisting of hydrogen and alkyl hydrocarbon groups preferably having less than 6 carbon atoms) together with some by-product naphthohydroquinone or derivatives having a structure as follows:

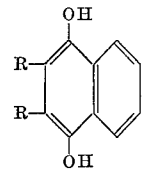

and some unreacted naphthoquinone or derivatives having the structure:

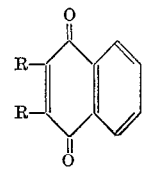

some $C_1$ to C alcohol reaction media, and in most cases some inorganic catalyst.

The 1,2,3,4-tetrahydronaphthalene diol products and the other aromatics are soluble in the alcoholic reaction mixture. Therefore, while simple filtration will in most cases suffice to remove virtually all of the inorganic catalyst, and while distillation will remove a major portion of the alcoholic reaction media, separation of the aromatic product from the aromatic by-products and raw materials is difficult. Repeated washings with ethanol or chloroform are not effective since the product, the by-products and the raw materials are all dissolved by the ethanol, and the same has also been found to be true of chloroform washes. Evaporating a major portion of the ethanol and adding water has been found to be ineffective because while the product is precipitated, substantial quantities of the impurities are also precipitated when the water is added. The quantity of impurities present is in most cases sufficiently high to prevent satisfactory purification by fractional crystallization techniques. Also techniques involving temperatures above about 200° C. must be avoided to insure against decomposition of the product.

Similarly, so-called petroleum ethers (approximately $C_3$ to C, primarily straight chain hydrocarbons), Skellysolve (approximately $C_5$ to $C_8$ hydrocarbons), pure hexane, acetone, and water alone have all been found either to dissolve the impurities in substantial quantities while dissolving the product, or not to dissolve sufficient quantities of the impurities. Thus, while the precise mechanism by which solvents having an ether linkage precipitate 1,2,3,4-tetrahydronaphthalene diol from the product mixture is unknown, the action of the ethers is unexpectedly superior to that of other commonly available economical solvents.

The hydrocarbyl acyclic ethers having from 2 to 10 and preferably from 3 to about 6 carbon atoms are preferred for the process of the present invention. However, most ethers boiling below 200° C. including ethers containing aromatic nuclei as, for example, dibenzyl ether and diphenol ether have been found usable. Such aromatic ethers are not preferred because their relatively high boiling points require temperatures which may approach the decomposition temperatures of the product, even where vacuum distillation is employed.

The present invention embodies the discovery that, by evaporating much of the alcohol, and thereafter adding at least 30% by volume based on the volume of the remaining product mixture of an ether boiling below about 200° C. the desired product will be precipitated while the major portion of impurities will remain in solution, thus permitting recovery of substantially pure product by recovering the precipitate through filtration, decantation, centrifugation, or other conventional solid-liquid separatory techniques.

In a preferred embodiment of the process of the present invention, a polycyclic aromatic-p-quinone in which at least one quinoid structure is terminal, that is, external to the polycyclic series, is reacted with hydrogen in the presence of a catalyst. Examples of suitable aromatic-p-quinones are: 1,4-naphthoquinone which is most preferred; 2-hydroxy - 1,4-naphthoquinone; 2 - methyl-1,4-napthoquinone; 2,3 - dichloro-1,4-naphthoquinone; 5-hydroxy - 2 - methyl-1,4-naphthoquinone; and 2,5,8-trihydroxy - 1,4-naphthoquinone among others. Either or both the quinoid ring or the aromatic ring can be substituted with a variety of radicals so long as the radicals do not interfere with the hydrogenation reaction, or cause deleterious side reactions.

The hydrogenation reaction is preferably carried out at from 125 to about 175° C., most preferably at from about 135 to 165° C. for preferably from about 2 to about 6 hours, and at hydrogen pressures of about 1,000 and preferably above 3,000 p.s.i.g. The preferred hydrogenation catalyst is copper chromite.

The preferred copper chromite is that produced by the method of W. A. Lazier and H. R. Arnold, Organic Synthesis, collective vol. II, John Wiley, New York, N.Y., 1943, page 142.

Copper chromite utilized in the process of this invention can be solid in form or deposited on a nonacidic material, such as silica, according to known techniques. Normally, only from about 5.0 to about 21.4 grams of catalyst per gram mole of quinone is required, though 10–30 grams per gram molecule are preferred. More or less catalyst can be utilized as desired.

The preferred reaction media for the hydrogenation reaction are alkanols having from 1 to about 6 carbon atoms. The reaction media will be present in amounts sufficient to dissolve the particular quinone being employed, and most preferably in amounts of from about 500 to 2,000 volumes of solvent per mole of quinone.

The reaction product mixture is preferably cooled from reaction temperature to about 25° C. and is then filtered through a Buchner funnel, filter press or other conventional means in order to remove the major portion of the inorganic catalyst.

The alcoholic reaction media is evaporated until less than about 0.1 to 4 and preferably about 1 to 2 parts by weight of alcohol remain for each part by weight of aromatic compounds. $C_1$ through $C_3$ alcohols are especially preferred as reaction media in order that the temperature required during evaporation at this point not exceed the decomposition temperature of the product. Conventional vacuum distillation will be preferred for removing the alcoholic reaction media. In most cases, the media will be recycled directly back to the reactor to permit its use in later hydrogenation reactions.

To the product mixture remaining after evaporation will be added at least 30% and preferably from 100 to 300% by weight based on the weight of the aromatic compounds of an ether having from 2 to about 10 carbon atoms, most preferably ethyl ether. This addition will preferably be conducted at a temperature of from 0° C. to about 30° C. and in most cases a precipitate will immediately form and gradually coalesce at the bottom of the mixture, permitting decantation of a major portion of the liquid phase. The precipitate will consist of substantially pure aryl polycyclic polyhydric alcohols. In a case of 1,2,3,4-tetrahydronaphthaline diol, the purity at this stage will be aproximately 90% with the remainder being primarily naphthoquinhydrone.

While the precipitated product from the present process has relatively good purity as compared to the product of other processes which have been utilized, it may be desirable in some instances to further improve the purity of the product. This can conveniently be accomplished by dissolving the precipitate in ethyl alcohol, adding from 10 to about 150 and preferably from 40 to 80 weight percent activated carbon based on the weight of the product and raising the temperature of this solution to from 50 to 80° C. and preferably bringing the solution to a boil under approximately atmospheric pressure. After 10 to about 30 minutes, the carbon is filtered off and the excess alcohol is stripped by distillation or other conventional means as described in the previous alcohol removal step, and diethyl ether is added as described previously. The now white tetralin diol is recovered by cooling and filtering as previously. Further purification of the 1,2,3,4-tetrahydronaphthalene diol may be accomplished by dissolving in a convenient solvent preferably a mixture of 80% by weight ethyl alcohol with 20% by weight petroleum ether and recrystallizing at temperatures not above 35° C.

EXAMPLE I

A 15.8 g. portion of 1,4-naphthoquinone (0.100 mole) is dissolved in 150 ml. of absolute ethanol. Copper chromite (2.4 g.) is added to the solution, and the mixture placed in a nitrogen-filled rocking bomb. The reaction mixture is heated at 150° C. for 4 hours under hydrogen pressure of about 3,000 p.s.i.g. At the end of the 4-hour period, the bomb is vented and the product mixture withdrawn.

The cooled reaction mixture is filtered through Hy-Flo filter-cell, a diatomaceous earth type filter media manufactured by the Johns-Manville Corporation. The filter media is supported in a Buchner funnel. The precipitate consists primarily of copper chromite catalyst which is recycled for use in further hydrogenation reactions.

The filtrate is distilled down to about 10 to 20% of its original volume under an absolute pressure of about 15 mm. of Hg yielding a thick purple oil as the distillation residue. To this residue is added approximately 100 ml. of diethyl ether. The resulting mixture is filtered to recover approximately about 8.5 g. of a slightly pink solid. The precipitate is dissolved in ethyl alcohol and treated with approximately 20 g. of activated charcoal and brought to a boil under atmospheric pressure. The solution is filtered to remove the activated carbon and the ethanol is distilled off until the volume of the residue is aproximately 10% of the volume of the original solution. The residue is an oily liquid which forms a white precipitate when approximately 100 ml. of ethyl ether are added. Recovery of the precipitate by filtration yields approximately 7.0 g. of a white solid which is then dissolved in approximately 50 ml. ethanol at about 75° C. 20% of the volume of ethanol of petroleum ether is added to promote crystallization. Cooling the solution to room temperature yields approximately 6.5 g. of needle-like crystals of 1,4 - dihydroxy-1,2,3,4-tetrahydronaphthalene having a melting point of 137.8 to 138.0° C. The purity of the product prior to recrystallization is approximately 98% by weight, and after recrystallization, this is improved to approximately 99+% by weight. Purity is in all cases determined by gas liquid partition chromatography and carbon, hydrogen, oxygen analyses both according to standard method.

Calculated for $C_{10}H_{12}O_2$ (percent); C, 73.17; H, 7.32; OH, 20.7. Found (percent): C, 73.25; H, 7.42; OH (by acetylation), 20.0.

EXAMPLE II 17.2 g. 2-methyl-1,4-naphthoquinone (0.1 mole), 2.14 g. $CuCrO_4$ and 150 ml. absolute ethanol are placed in the reactor. The bomb is charged with 3,000 p.s.i. of $H_2$ and brought to 150° C. for 4 hours. Maximum pressure reached is 3,600 p.s.i. The final pressure at 30° is 2,250 p.s.i. The light yellow solution is filtered through Hy-Flo filter cell (Johns-Manville). The ethanol is concentrated in vacuo to about 10% of its original value, yielding a thick oil. Diethyl ether is added to precipitate a white solid, M.P. 174 to 176° C. This product is recrystallized from 95% ethanol and heptane to yield colorless platelets of 2-methyl-4-hydroxy-1-tetralol, M.P. 183.5 to 184° C.

Calculated for $C_{11}H_{14}O_2$ (percent): C, 74.20; H, 7.87; O, 17.97. Found (percent): C, 73.98; H, 7.64; O, 17.94.

It will be apparent that the process of the present invention is adaptable to a variety of modifications and all such apparent variations are intended to be covered by the claims attached hereto.

What is claimed is:

1. A method of recovering compounds having the structure:

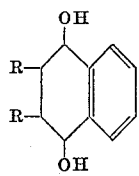

where R is selected from the group consisting of hydrogen and alkyl hydrocarbon groups having less than 6 carbon atoms, from product mixtures containing said compounds together with an alkanol having from 1 to 6 carbon atoms, compounds having the structure:

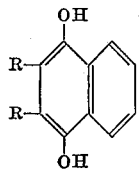

and compounds having the structure:

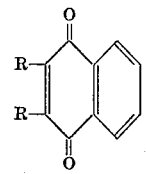

where R is defined as above in all cases, said method comprising in combination the steps of evaporating said alcohol until less than 0.1 to 4 parts by weight alcohol remain for each part by weight of the above aromatic compounds, thereafter adding at least 30% by weight based on the weight of the above aromatic compounds of a hydrocarbyl ether containing from 2 to about 10 carbon atoms and boiling below 200° C. at atmospheric pressure and recovering the precipitate thus formed.

2. The process of claim 1 wherein one R is hydrogen and the other R is a methyl group.

3. The process of claim 1 wherein both R's are hydrogen throughout.

4. The process of claim 3 wherein the ether contains from 3 to about 6 carbon atoms.

5. The process of claim 3 wherein the ether is diethyl ether.

References Cited

UNITED STATES PATENTS

| | | |
|---|---|---|
| 2,087,691 | 7/1937 | Lazier. |
| 2,427,337 | 9/1947 | Abbott et al. |
| 2,537,968 | 1/1951 | Cerveny. |
| 2,575,403 | 11/1951 | Young et al. |
| 3,375,285 | 3/1968 | Argabright. |

OTHER REFERENCES

Boyland et al.: "J. Chem. Soc.," 1951, pp. 1837–40.
Sawa et al.: "Chem. Abstracts," vol. 51, pp. 5026–27 (1957).

LEON ZITVER, Primary Examiner
N. P. MORGENSTERN, Assistant Examiner

PO-1050
(5/69)

UNITED STATES PATENT OFFICE
CERTIFICATE OF CORRECTION

Patent No. 3,534,109        Dated Oct. 13, 1970

Inventor(s) Harold D. Rider

It is certified that error appears in the above-identified patent and that said Letters Patent are hereby corrected as shown below:

Col. 2, line 32:   C should read --$C_6$--

Col. 2, line 56:   C should read --$C_6$--

SIGNED AND
SEALED
DEC 29 1970

(SEAL)
Attest:

Edward M. Fletcher, Jr.
Attesting Officer

WILLIAM E. SCHUYLER, JR.
Commissioner of Patents